United States Patent

Meier

[11] Patent Number: 5,677,942
[45] Date of Patent: Oct. 14, 1997

[54] WIRELESS INTERFACE

[75] Inventor: Rolf G. Meier, Carp, Canada

[73] Assignee: Mitel Corporation, Kanata, Canada

[21] Appl. No.: 702,801

[22] Filed: Aug. 26, 1996

Related U.S. Application Data

[63] Continuation of Ser. No. 211,864, filed as PCT/CA92/00466, Oct. 22, 1992, published as WO93/08667, Apr. 29, 1993.

[30] Foreign Application Priority Data

Oct. 22, 1991 [CA] Canada ................... 2053776

[51] Int. Cl.$^6$ .................. H04Q 7/24; H04Q 7/26
[52] U.S. Cl. .................. 379/58; 379/63; 379/59; 455/33.1
[58] Field of Search .................. 379/58, 59, 61, 379/63; 455/33.1, 54.1

[56] References Cited

U.S. PATENT DOCUMENTS

| | | | |
|---|---|---|---|
| 4,268,722 | 5/1981 | Little et al. | 379/59 X |
| 4,757,496 | 7/1988 | Bartholet et al. | 370/85 |
| 4,837,800 | 6/1989 | Freeburg et al. | 379/59 X |
| 5,274,694 | 12/1993 | Lechner et al. | 379/63 |
| 5,323,446 | 6/1994 | Kojima et al. | 379/59 X |

FOREIGN PATENT DOCUMENTS 0168647  1/1986  European Pat. Off. .

*Primary Examiner*—Curtis Kuntz
*Assistant Examiner*—Nay Maung
*Attorney, Agent, or Firm*—Marks & Clerk

[57] ABSTRACT

A wireless telephone system includes: a PBX connected by a wireline to at least one base station for communicating over a radio link with mobile telephones; a unit for transmitting and receiving audio and data signals over the wireline between the PBX and the base station; a unit for transmitting and receiving audio and data signals over the radio link between the base station and a mobile telephone; and in the base station a unit for separating incoming audio and data signals channels, a unit for combining outgoing audio and data signals for onward transmission thereof from the base station, and a unit for interpreting the data signals and either acting on the data signals if they are intended for the base station or otherwise passing the signals through the base station for onward transmission to the receiving unit.

6 Claims, 1 Drawing Sheet

WIRELESS INTERFACE

This application is a continuation of application Ser. No. 08/211,864 filed on Apr. 20, 1994, and which is a 371 of PCT/CA92/00466 published as WO93/08667, Apr. 29, 1993.

FIELD OF THE INVENTION

This invention relates to a wireless telephone system comprising a PBX connected by a wireline to at least one base station which communicates over a radio link with mobile telephones.

BACKGROUND OF THE INVENTION

Telephone sets for connection to the PSTN (Public-Switched Telephone Network) which communicate by radio link with portable hand sets, have been available for some time. In office environments it is desirable to provide a PBX-based system operating in a similar way. The PBX is connected to the PSTN and communicates with mobile handsets via radio links. In such a system, in order to cover a wide area, the PBX is generally connected by wireline link to a number of base stations which establish a radio link with the mobile handsets. While telephones have been developed which employ digital modulation for signalling, voice and synchronization, currently, a means is required to interface such wireless handsets to the wireline network through a PBX (Private Branch Exchange), and an object of the invention is to provide such a system.

EP 168,647 discloses a mobile telephone system comprising a switching center and a plurality of base stations. However, this system is intended for broad coverage cellular networks and is not suitable for local PBX environments. In this system the data and audio channels are digitally multiplexed for transmission to between the switching center and the base stations.

SUMMARY OF THE INVENTION

According to the present invention there is provided a wireless telephone system comprising: a private branch exchange (PBX) for connection to the PSTN (Public Switched Telephone Network) and connected by a wireline to at least one base station for communicating over a radio link with mobile telephones, means for transmitting and receiving audio and message signals over the wireline between the base station and said exchange; and in the base station means for separating incoming audio and message signals for onward transmission thereof from the base station; said means for transmitting and receiving said audio and message signals over the wireline comprising means for transmitting said audio signals as a full-duplex in-band audio signal and said message signals as an out-of-band modulated carrier signal on said wireline, and said base station further comprising means for converting said in-band and out-of-band signals to respective serial audio and message bit streams, a microprocessor for interpreting said message signals to determine whether they are intended for the base station or the mobile telephone and extracting message signals intended for the base station, said microprocessor acting on said messages intended for said base station to adjust a condition thereof, and means for combining the audio bit stream and the message bit stream intended for the mobile telephone which contains signaling information, into a single bit stream for transmission over the radio link, and wherein said wireline is a twister-pair two-wire line, and each base station comprises a two-to-four wire converter at the interface with said wireline.

With the system in accordance with the invention, it is possible to locate the wireless base station remotely from the PBX. This allows the radio coverage of the base stations to be optimized since their location is flexible. Preferably, a carry over voice (COV) interface is employed to permit message-based signalling.

In particular, in a preferred embodiment the wireline consists of a twisted pair providing a full duplex in band audio signal and an out of band full duplex data signal modulated at 32-kHz. The data signal contains the message information which is transmitted from the PBX to the base station and vice versa.

Preferably the twisted pair also provides a dc voltage feed, which can be used to supply power to the base station. A power supply converts the 48 volt dc appearing on the line into a voltage suitable for powering the base station.

BRIEF DESCRIPTION OF THE DRAWING

The invention will now be described in more detail, by way of example only, with reference to the accompanying drawing, in which.

DESCRIPTION OF A PREFERRED EMBODIMENT

Figure 1:
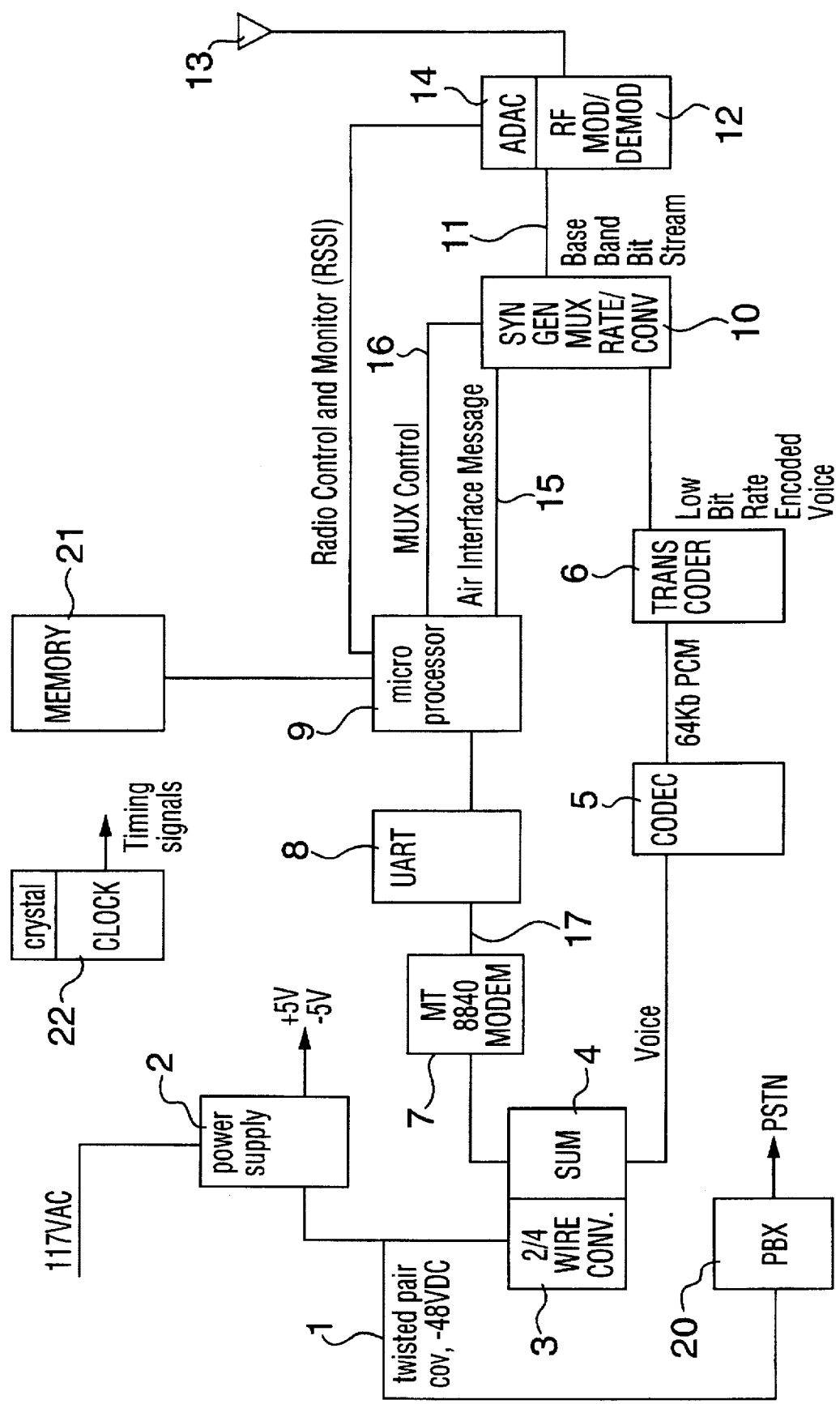
FIG. 1 is a block diagram of a wireless base station in accordance with one embodiment of the invention.

Referring now the drawing, all links are bidirectional (4-wire) unless otherwise indicated. The base station comprises a 2-to-4 wire converter 3 associated with a summer 4 connected to a twisted pair wireline 1, which is in turn connected to a PBX 20 connected to the PSTN (Public Switched Telephone Network). Twisted pair 1 is also connected to power supply 2, which provides ±5 V regulated output for powering the base station. The power supply 2 can also be connected to 117 volt AC line for emergencies.

The summer 4 is connected through modem 7, which can be an MT 8840, and then by data link 17 to a UART 8, which in turn is connected to a microprocessor 9 associated with a memory 21. Clock 22 provides timing signals for the microprocessor 9 and the entire system.

The microprocessor 9 is connected over control line 16 or interface message line 15 to a Mux/rate conversion unit 10, which in turn is connected over a line 11 to an RF modulator/demodulator 12 connected to antenna 13.

The summer 4 is also connected over an audio line to Codec 5, transcoder 6 and Mux/rate conversion unit 10.

In operation, the signals to and from the wireline system are carried to and from the base station over the twisted pair of copper wires 1. The signals on the twisted pair 1 consist of a full duplex in-band audio signal, in the band 0–4 kHz, and a data signal, which is present as an out-of-band full duplex signal modulated at 32 kHz. The data signal contains message information which is transmitted from the PBX to the base station and vice versa.

In addition, the twisted pair 1 provides a dc voltage feed, which is used to provide power to the base station. This is done by the switching power supply 2, which converts the −48 V dc appearing on the line into a ±5V supply.

The audio signal present on the twisted pair 1 is converted to a 4-wire signal by means of the 2-to-4 wire converter 3. In addition, the 32 kHz carrier signal is combined with the audio information by the summer circuit 4.

The incoming voice signal from the wireline 1 is converted to digital format by means of the codec 5 which produces a 64-kbit/sec serial bit stream. A voice processing block 6, which usually consists of a DSP (Digital Signal Processor), performs a predetermined sequence of operations on the 64-kbit/sec serial stream. A typical operation is voice compression, wherein the digitally-encoded voice is reduced in data rate while maintaining high information content, thereby preserving bandwidth on the radio channel. An example of an algorithm for performing such an operation can be found in the CCITT document G.721.

In some implementations, the functions of the codec 5 and transcoder 6 functions can be combined into a single block, or the codec 5 may be a special design which produces a low-bit-rate encoded voice signal.

The incoming 32-kHz carrier signal from the wireline is processed by a modem circuit 7, which results in a baseband data stream 17. The data stream is buffered by a UART (Universal Asynchronous Receiver and Transmitter) 8 to permit it to be easily interfaced to a microprocessor 9. The UART function can be performed directly within the microprocessor 9.

The microprocessor 9 examines the data stream sent from the wireless telephone and the PBX, and interprets the contained messages according to a predetermined sequence of operations. Various functions are performed by the microprocessor on these messages such as:

1) The messages from the PBX are interpreted according to whether they are meant for the base station, or for subsequent transmission to the wireless telephone, and similarly, the messages from the wireless telephone are interpreted according to whether they are intended for the base station or for subsequent transmission to the PBX. This may be done by means of a message type byte.

2) In the event that the messages are intended for the base station, they are acted on by the microprocessor according to the requirements of the message. An example of such a message might be a request to adjust the output level of the base station.

3) In the event that messages are intended to communicate between the wireless telephone and the PBX, the messages are either passed transparently through the base station, or, if required, changed in format such that they may be interpreted correctly by the intended recipient. This can be done by means of a look-up table, stored in the microprocessor's memory block.

In addition, the microprocessor 9 performs the link access protocol as required by the radio interface standard. Such protocols have been defined in a number of standards, such as IETS-300-131 (otherwise known as the CT₂ Common Air Interface) and the DECT standard. These standards contain all the algorithms necessary for establishing the radio link, as well as a definition of the messages 15 required for communication with the wireless handset.

A multiplexer/demultiplexer circuit 10 combines and separates the air interface messages and low-bit-rate encoded voice channels such that a single baseband bit stream 11 is available for a radio transceiver. This circuit is controlled by the microprocessor 9 to ensure that the signaling and information channels, i.e. the message and voice channels respectively, are combined according to the sequence required by the radio interface. In addition, the microprocessor inserts and decodes a predetermined sequence of "synch" bits, which are used to synchronize the transceiver in the remote terminal with the transceiver in the base station.

The RF (radio frequency) block 12 converts the baseband bit stream into a waveform which is suitable for transmission and reception by radio by means of the antenna 13. In a typical transceiver, one or more carrier frequencies are available depending on the particular air interface standard employed. The carrier frequencies are selected by the microprocessor 9 according to a predetermined sequence, which is defined by the air interface standard. In addition, the transceiver 12 provides information to the microprocessor on the status of the available carrier frequencies, such as signal strength, and interference. The interface between the microprocessor 9 and the RF block 12 is an A-to-D (analog to digital) and D-to-A (digital to analog) converter 14. The microprocessor 9 can also control the amplitude of the transmitted signal.

The described base station offers a number of advantages. The use of the carrier-over-voice (COV) interface allows optimization of radio coverage due to the flexible location of the base station. This is particularly advantageous in that there is already a large installed base of switching systems with COV line cards.

The base stations can be provided remotely from the PBX. Messages can be routed through the base station between the handset and PBX, with the base station only intercepting those messages intended for it.

The protocol and message conversion occurs in the base station. This allows the switching systems protocol to communicate with the radio interface protocol.

I claim:

1. A wireless telephone system comprising: a private branch exchange (PBX) for connection to the PSTN (Public Switched Telephone Network) and connected by a wireline to at least one base station for communicating over a radio link with mobile telephones, means for transmitting and receiving audio and message signals over the wireline between the base station and said exchange; and in the base station means for separating incoming audio and message signals for onward transmission thereof from the base station; said means for transmitting and receiving said audio and message signals over the wireline comprising means for transmitting said audio signals as a full-duplex in-band audio signal and said message signals as an out-of-band modulated carrier signal on said wireline, and said base station further comprising means for converting said in-band and out-of-band signals to respective serial audio and message bit streams, a microprocessor for interpreting said message signals to determine whether they are intended for the base station or the mobile telephone and extracting message signals intended for the base station, said microprocessor acting on said messages intended for said base station to adjust a condition thereof, and means for combining the audio bit stream and the message bit stream intended for the mobile telephone which contains signaling information, into a single bit stream for transmission over the radio link, and wherein said wireline is a twister-pair two-wire line, and each base station comprises a two-to-four wire converter at the interface with said wireline.

2. A wireless telephone system as claimed in claim 1, wherein said wireline provides a dc power supply to each base station.

3. A wireless telephone system as claimed in claim 1, wherein said data signals are converted in the base station to a baseband bitstream that is input to a microprocessor acting as said interpreting means.

4. A wireless telephone system as claimed in claim 3, further comprising a UART between said wireline and said microprocessor.

5. A wireless telephone system as claimed in claim 3, wherein on the wireline side incoming audio signals are converted to a low bit rate digital format before being input to a multiplexer where said converted audio signals are combined with data signals from the microprocessor for onward transmission through an RF modulator over the radio link.

6. A wireless telephone system as claimed in claim 5, further comprising a codec and transcoder for converting the incoming audio signals from the PBX to said low-bit rate digital format.

* * * * *